United States Patent [19]
Yang

[11] Patent Number: 5,379,117
[45] Date of Patent: Jan. 3, 1995

[54] SUPPORTING MEMBER FOR A VLMF COIL

[75] Inventor: Hyeon S. Yang, Seoul, Rep. of Korea

[73] Assignee: Samsung Electron Devices Co., Ltd., Kyungki-do, Rep. of Korea

[21] Appl. No.: 801,067

[22] Filed: Dec. 3, 1991

[30] Foreign Application Priority Data

Dec. 12, 1990 [KR] Rep. of Korea .................. 90-19572

[51] Int. Cl.$^6$ ............... H04N 5/645; H01J 29/06; H01F 13/00
[52] U.S. Cl. ...................... 358/400; 315/8; 361/150
[58] Field of Search ............. 358/248, 245; 313/313; 315/8, 85; 174/35 MS; 335/210, 213, 284; 361/150

[56] References Cited

U.S. PATENT DOCUMENTS 4,359,707 11/1982 Spannhake et al. .................. 315/8

Primary Examiner—Edward L. Coles, Sr.
Assistant Examiner—Thomas D. Lee
Attorney, Agent, or Firm—Ladas & Parry

[57] ABSTRACT

A supporting member for a VLMF coil having a coupling portion with the same curvature as that of the corner portions of a CRT and a transversely elongated slot for inserting the VLMF coil. The supporting member protects the VLMF coil from any deformation or displacement and secures the VLMF coil even against external impacts so that leaking magnetic fields can effectively be offset by the VLMF coil.

10 Claims, 2 Drawing Sheets

FIG. 3A
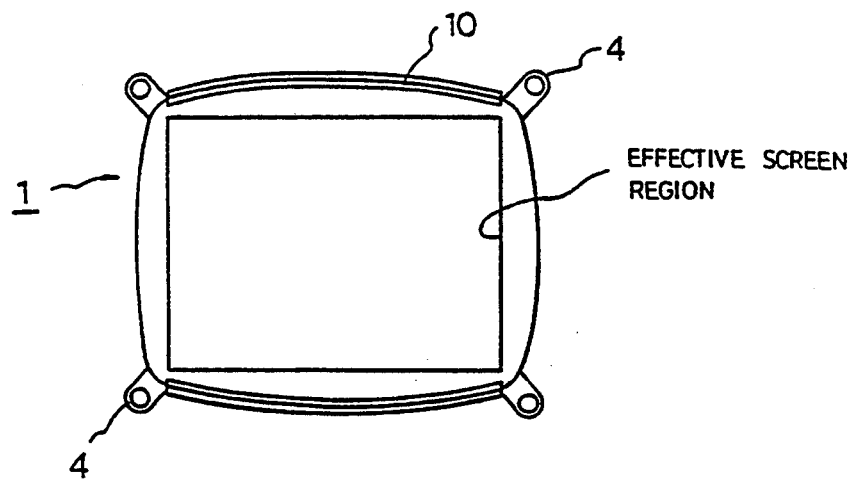
FIG. 3C 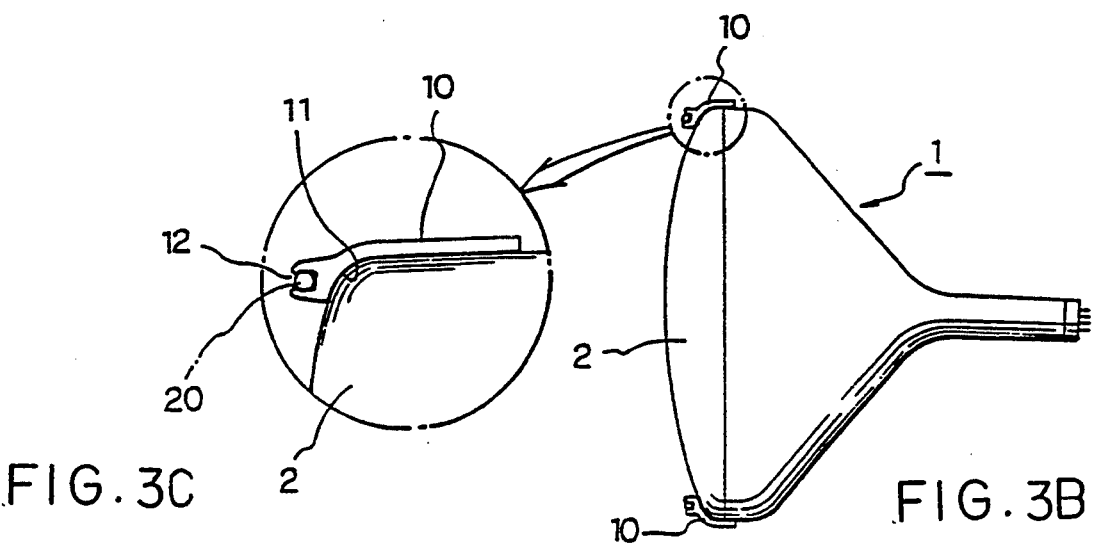 FIG. 3B
FIG. 4
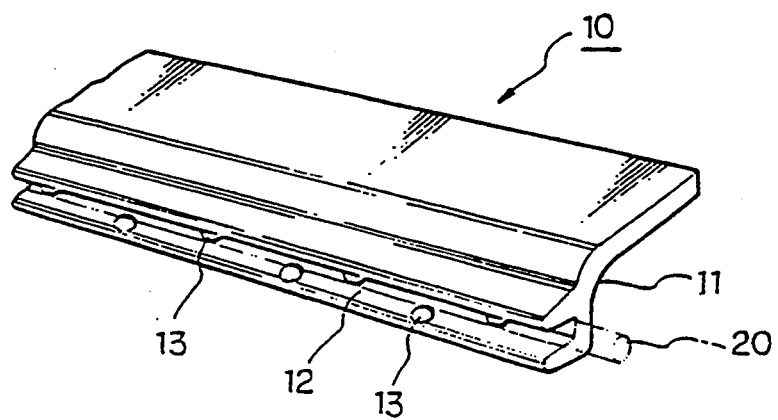

SUPPORTING MEMBER FOR A VLMF COIL

FIELD OF THE INVENTION

The present invention relates to a supporting member for a VLMF (Very Low Frequency Magnetic Field) coil of a CRT (Cathode-Ray Tube), and more particularly, to a supporting member for a VLMF coil in which the VLMF adapted coil for offsetting a leaking magnetic field generated from a deflecting yoke of the CRT can be simply installed, preventing the VLMF coil from deforming or displacing.

BACKGROUND OF THE INVENTION

Generally, as shown in FIG. 1, in the conventional CRT 1, a deflecting yoke 3 generates magnetic fields for deflecting electron beams, and in particular, a horizontal deflecting magnetic field is partially leaked toward the front of the CRT 1, influencing its surroundings.

In order to overcome the above disadvantages due to the leaking magnetic fields, VLMF coils 20 are transversely installed on the upper and lower portions of the CRT 1 respectively to generate polarities opposite those of the leaking magnetic fields, so that the leaking magnetic fields and the magnetic produced fields by the VLMF coils 20 can offset each other.

Conventionally, in order to install such VLMF coils 20 onto the CRT 1, the VLMF coils 20 are attached to the upper and lower portions of the CRT 1 by a tape and the like, or rectangular wire frame is formed of the same size as that of the external panel of the CRT 1 to attach the VLMF coils to wire frame by the tape and the like. However, the VLMF coils are displaced due to the slippery surface of the CRT 1, and when assembling the CRT 1 in the housing of a TV, the wire frame is so easily collapsed that the VLMF coils are also deformed or displaced, thereby degrading the effect of the VLMF coils.

Further, the above problems can develop even upon a slight impact, and therefore, the desired effect is drastically reduced.

SUMMARY OF THE INVENTION

Therefore, it is an object of the present invention to provide a supporting member for a VLMF coil for installing and supporting the VLMF coil firmly without any deformation or displacement.

In order to achieve the above object, the supporting member for the VLMF coil according to the present invention is constituted such that the supporting member includes a coupling portion having the same curvature as that of the upper and lower corner portions of a CRT and a transversely long slot in the front portion thereof for inserting the VLMF coil.

BRIEF DESCRIPTION OF THE DRAWINGS

The above object and other advantages of the present invention will become more apparent by describing in detail a preferred embodiment of the present invention with reference to the attached drawings, in which:

FIGS. 3A and 3B illustrate an example of the installation of the supporting member of FIG. 2, in which FIG. 3A is a front view and FIG. 3B is a side view; and FIG. 3C is an enlarged view of a portion of FIG. 3B;

FIG. 4 illustrates another example of the installation of a supporting member for a VLMF coil according to the present invention.

DETAILED DESCRIPTION OF THE PREFERRED EMBODIMENT

Figure 1:
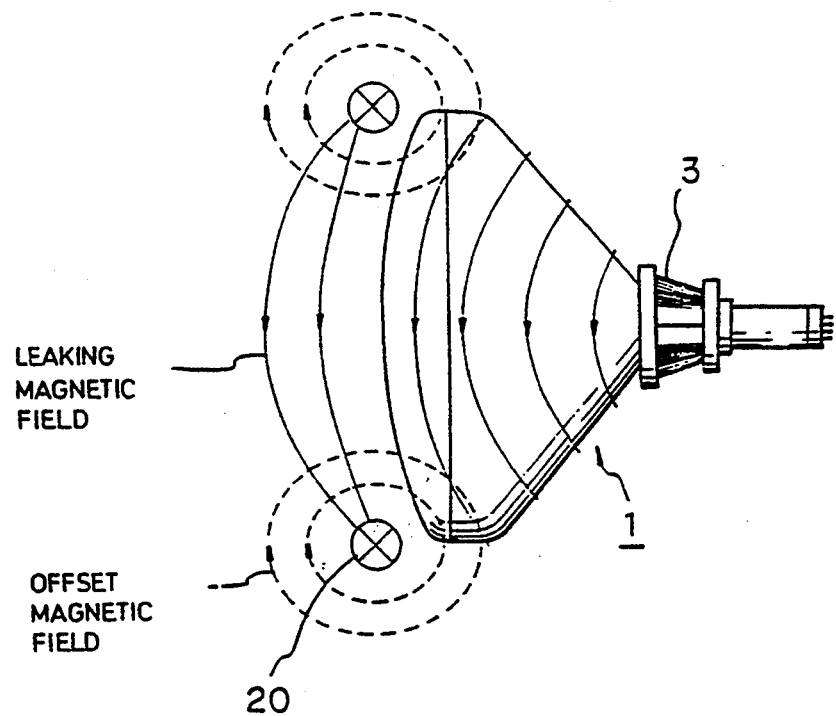
FIG. 1 illustrates the relationship between the magnetic fields of a VLMF coil and those of a deflecting yoke.
Figure 2:
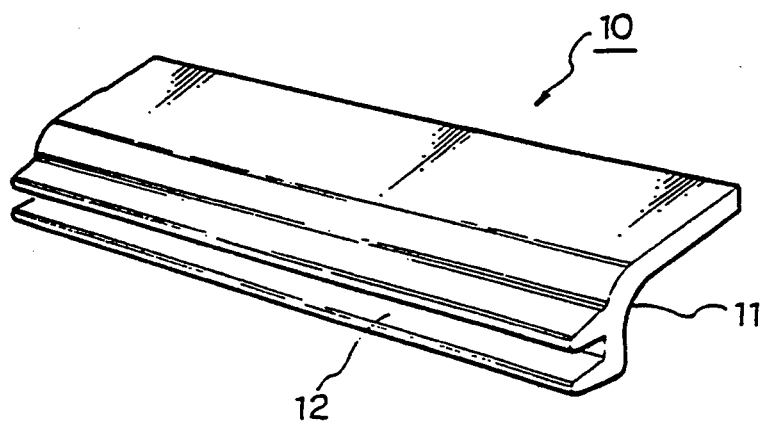
FIG. 2 is a perspective view showing a supporting member for a VLMF coil according to the present invention.

FIG. 2 is a perspective view showing a preferred embodiment of a supporting member 10 for a VLMF coil according to the present invention. The supporting member 10 for the VLMF coil according to the present invention comprises a curved, bend or a coupling portion 11 having the same curvature as that of the upper and lower corner portions of a CRT, and an elongated slot 12 transversely formed in the front portion of the coupling portion.

Referring to FIGS. 3A, 3B and 3C, a plurality of such supporting members 10 as above are attached to the upper and lower portions of the front panel 2 of the CRT 1. The coupling portion 11 of the supporting member 10 can be attached to the CRT 1 easily by double face adhesive tape or other bonding means. The supporting member 10 is formed so as not to cover the visible screen region of the CRT 1.

In FIG. 3A, reference numeral 4 indicates a lug for coupling the CRT 1 with the TV housing, which is omitted in FIG. 3B.

Thus, the supporting member 10 is attached to the corner regions of the upper and lower edges of the panel 2, and VLMF coils 20 are inserted into the slot 12. The supporting member 10 can hold the VLMF coils 20 securely even against external impacts, so it is not necessary for the VLMF coils 20 to be affixed in the slot 12. Further, the width of the entrance of the slot 12 is made to be the same as or a little bit smaller than that of the VLMF coils 20, and the width of the interior of the slot 12 is made to be the same as the diameter of the VLMF coils 20, so that the supporting member 10 can elastically hold the inserted VLMF coils 20.

The VLMF coils 20 installed in the CRT 1 as described above are protected from any deformation or displacement while assembling the CRT 1 to the TV housing.

Therefore, the leaking magnetic fields are offset by the VLMF coils 20 accurately and efficiently.

FIG. 4 illustrates another embodiment of a supporting member for a VLMF coil according to the present invention, where the supporting member 10 is further provided with a plurality of protuberances 13 at the upper and lower portions of the entrance of the slot 12.

Because of the supporting member 10, once the VLMF coil 20 is inserted into the slot 12, the coils 20 rarely come out of the slot due to external impacts and can be retained more securely by the supporting members.

According to the present invention as described above, the supporting member for the VLMF coil comprising the coupling portion of the same curvature as that of the corner parts of the upper and lower portions of the CRT and the transversely elongated slot can secure the VLMF coil easily without any displacement or deformation, as well as making it easy to couple the VLMF coil with the TV housing.

Consequently, the leaking magnetic fields can be accurately offset by the safely secured VLMF coil and the damage or deformation of the coil during the assembling of the VLMF coil to the TV housing can be effectively prevented, as well as improving the working efficiency.

What is claimed is:

1. Support means for a VLMF coil adapted for mounting on a CRT, the CRT having upper and lower edge portions at which rounded corners are formed, said support means comprising a first coupling member mounted on the upper edge portion of a CRT, a second coupling member mounted on the lower edge portion of said CRT, the first and second coupling members being separate and distinct, said coupling members having bend regions with a curvature corresponding to the rounded corners of the upper and lower edge portions of the CRT so that said bend regions can be snugly fitted on said corners, each said coupling member having a front face at which said coupling member is provided with an open slot extending transversely of said CRT, said slot facing outwardly of said coupling member to enable insertion of a VLMF coil in said slot after the coupling member is fitted on said corner of the CRT.

2. Support means as claimed in claim 1, wherein said slot has an entrance opening for the VLMF coil which is not greater than the diameter of said coil, the slot having an interior with a width equal to the diameter of said coil.

3. Support means as claimed in claim 1, comprising bonding means securing said coupling member to said CRT.

4. Support means as claimed in claim 3, wherein said bonding means comprises double faced tape.

5. Support means as claimed in claim 1, wherein each said coupling member includes a relatively flat mounting portion for resting on said CRT at the upper and lower edge portions thereof, said mounting portion extending from said bend region, said coupling member further including a front portion extending from said bend region in a direction opposite said mounting portion, said slot being provided in said front portion.

6. Support means as claimed in claim 5, wherein said slot defines upper and lower portions which elastically engage said VLMF coil to retain the coil in said slot.

7. Support means as claimed in claim 5, wherein said slot is formed in a front facing surface of said front portion.

8. Support means as claimed in claim 1, comprising a plurality of protuberances on each said coupling member at said slot to retain the VLMF coil in said slot.

9. Support means as claimed in claim 8, wherein said slot defines upper and lower portions bounding said slot, said protuberances being disposed on said upper and lower portions in alternating spaced relation.

10. Support means as claimed in claim 9, wherein said slot has an open entrance for said coil, said protuberances being on said upper and lower portions at said entrance.

* * * * *